(12) United States Patent
Chun et al.

(10) Patent No.: US 7,257,410 B2
(45) Date of Patent: Aug. 14, 2007

(54) METHOD FOR CONFIGURING AND ALLOCATING FORWARD CHANNEL IN ORTHOGONAL FREQUENCY DIVISION MULTIPLE ACCESS FREQUENCY DIVISION DUPLEX SYSTEM

(75) Inventors: Sun-Sim Chun, Daejeon (KR); Deuk-Su Lyu, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 173 days.

(21) Appl. No.: 10/835,876

(22) Filed: Apr. 29, 2004

(65) Prior Publication Data
US 2005/0048979 A1 Mar. 3, 2005

(30) Foreign Application Priority Data
Sep. 2, 2003 (KR) .................. 10-2003-0061086

(51) Int. Cl.
*H04Q 7/20* (2006.01)
(52) U.S. Cl. ............... 455/455; 455/69; 370/208
(58) Field of Classification Search ........... 455/455, 455/69; 370/208
See application file for complete search history.

(56) References Cited

U.S. PATENT DOCUMENTS

| | | | | |
|---|---|---|---|---|
| 5,590,409 | A * | 12/1996 | Sawahashi et al. | 455/69 |
| 2001/0036831 | A1 * | 11/2001 | Rezaiifar et al. | 455/455 |
| 2004/0095880 | A1 * | 5/2004 | Laroia et al. | 370/208 |

FOREIGN PATENT DOCUMENTS

| | | |
|---|---|---|
| JP | 10-13921 | 1/1998 |
| JP | 2000-270365 | 9/2000 |
| JP | 2001-45546 | 2/2001 |
| JP | 2001-231077 | 8/2001 |
| JP | 2002-111627 | 4/2002 |
| WO | WO 97/12489 | 4/1997 |
| WO | WO 02/09455 | 1/2002 |

OTHER PUBLICATIONS

Vincent Huang et al., "Optimal Resource Management in Packet-Switching TDD CDMA Systems", IEEE Personal Communications, Dec. 2000 (pp. 27-31).
Justin C.-I. Chuang et al., "Spectrum Resource Allocation . . . to Advanced Cellular Internet Service", IEEE Journal on Selected Areas in Comm. , vol. 16, No. 6, Aug. 1998 (pp. 820-829).

* cited by examiner

*Primary Examiner*—Joseph Feild
*Assistant Examiner*—Phuoc Doan
(74) *Attorney, Agent, or Firm*—Blakely Sokoloff Taylor & Zafman (57) ABSTRACT

Disclosed is a forward channel configuring method in an OFDMA FDD system. The method comprises: classifying the cells into a specific number of patterns based on location relations of the respective cells; allowing the respective base stations of the cells having different classified patterns to transmit control information to the mobile station at different times within a period of the forward channel, and allowing the respective base stations of the cells having the same classified patterns to transmit control information to the mobile station at the same time; and allowing the respective base stations to transmit traffic data to the mobile station irrespective of the classified patterns when the control information is transmitted.

16 Claims, 6 Drawing Sheets

METHOD FOR CONFIGURING AND ALLOCATING FORWARD CHANNEL IN ORTHOGONAL FREQUENCY DIVISION MULTIPLE ACCESS FREQUENCY DIVISION DUPLEX SYSTEM

CROSS REFERENCE TO RELATED APPLICATION

This application is based on Korea Patent Application No. 2003-61086 filed on Sep. 2, 2003 in the Korean Intellectual Property Office, the content of which is incorporated herein by reference.

BACKGROUND OF THE INVENTION (a) Field of the Invention

The present invention relates to an OFDMA (Orthogonal Frequency Division Multiple Access) FDD (Frequency Division Duplex) system. More specifically, the present invention relates to a method for configuring and allocating forward channels in an OFDMA FDD system.

(b) Description of the Related Art

In general, information transmitted forward by each base station provided in a cell in an OFDMA FDD system is classified as control data and traffic data. The information works as useful information for a base station, but it influences other neighboring base stations as interference.

Figure 1:
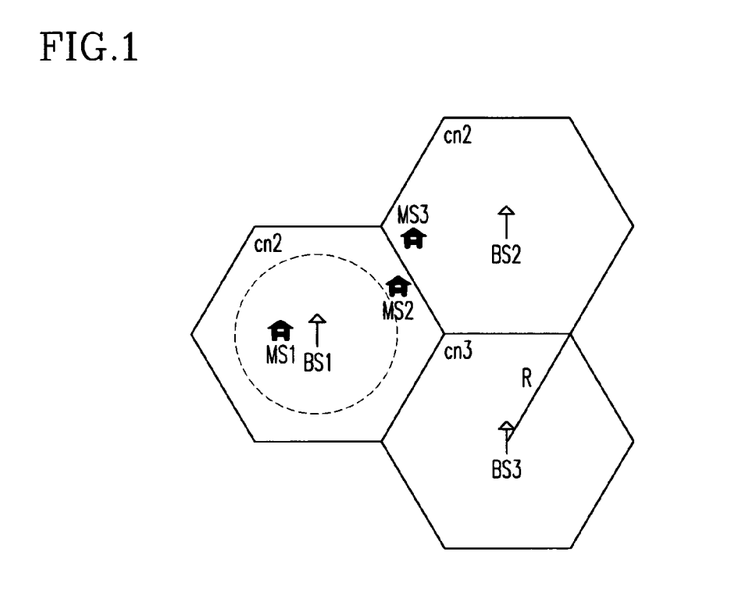
FIG. 1 shows an inter-cell interference generation diagram in a general mobile communication system.

For example, FIG. 1 shows an area influenced by the data transmitted by a base station BS1 in a first cell cn1 when first to third cells cn1, cn2, and cn3 are adjacent to each other. As to mobile stations MS1 and MS2 located in the first cell cn1, power intensity of the base station BS1 influencing the first mobile station MS1 is strong and surrounding interference influencing the same is weak since the first mobile station MS1 is located within the area of the first base station BS1, but power intensity of the base station BS1 influencing the second mobile station MS2 is relatively weak and surrounding interference influencing the same is relatively strong since the second mobile station MS2 is located on the border of the area of the first base station BS1, compared with those of the first mobile station case. In this state, when a mobile station located in the second cell cn2, i.e. a mobile station MS3, receives information from a base station BS2 by using very similar subcarriers in an area which is very close to the second mobile station MS2 located in the first cell cn1, information respectively provided to the second and third mobile stations MS2 and MS3 influences the other by interference which is generated among adjacent cells.

When respective users' priorities are defined by a scheduler for determining the priorities of user mobile stations, a channel allocation unit allocates subcarriers to the respective users following the defined priorities. In this instance, a channel allocation method for preventing interference between users uses a hopping pattern to regularly spread inter-cell interference or notify channel allocation information of a base station of other remaining base stations per period, and prevents other adjacent base stations from being allocated with repeated channels at the neighboring area.

A conventional paradigm will now be described as to an interference dispersion method using the hopping pattern and an interference avoiding method using a transmission time difference.

An exemplified interference-spreading method using the hopping pattern is disclosed by PCT (patent cooperation treaty) application number PCT/IL01/00681 entitled "Allocation of subcarriers to subscribers using Reed-Solomon codes", to be described subsequently.

An R-S (Reed-Solomon) code based on the prime number 23 is used to generate a basic pattern, and respective cells use different codes which increase by one from the basic pattern to generate a hopping pattern, or all the cells respectively use different basic patterns to generate a hopping pattern.

When the R-S 23 basic pattern is {0, 5, 2, 10, 4, 20, 8, 17, 16, 11, 9, 22, 18, 21, 13, 19, 3, 15, 6, 7, 12, 14, 1}, respective numbers that configure the basic pattern set are numbers of subcarriers that configure respective groups when all the subcarriers are divided into 23 groups. When the first cell cn1 uses the basic pattern to allocate the subcarriers to the terminals for the 23 groups, the second cell cn2 increases the basic pattern of the first cell cn1 by 1, and uses the one-increased basic pattern. The third cell cn3 increases the pattern of the second cell cn2 by 1 and uses it as a hopping pattern. The respective hopping patterns used for the cells in this manner are as follows.

The set of the first cell pattern={0, 5, 2, 10, 4, 20, 8, 17, 16, 11, 9, 22, 18, 21, 13, 19, 3, 15, 6, 7, 12, 14, 1}, the set of the second cell pattern={1, 6, 3, 11, 5, 21, 9, 18, 17, 12, 10, 0, 19, 22, 14, 20, 4, 16, 7, 8, 13, 15, 2}, and the set of the third cell pattern={2, 7, 4, 12, 6, 22, 10, 19, 18, 13, 11, 1, 20, 0, 15, 21, 5, 17, 8, 9, 14, 16, 3}.

The above-noted example is the method for using different hopping patterns to the cells to uniformly disperse inter-cell interference so that all the cells may use all the frequency ranges without superimposition at the transmission time. In the above, the increment of the pattern has been defined to be 1, and further, the set of patterns with the increment by n between the adjacent cells, that is, the set of patterns with great differences of subcarrier allocation patterns, can be selected.

The above-described method obtains a gain of dispersing the interference when load ratios of the surrounding cells are small, and cannot obtain the gain when the load ratios are large.

In a method for establishing transmission time differences for respective base stations and transmitting channel allocation information to other adjacent base stations, a base station that currently transmits channel allocation information notifies channel allocation information to be used at the area adjacent to other base stations, and other base stations allocate channels without using subcarriers repeated by neighboring base stations in consideration of interference used by the neighboring base stations. This TDMA-based information transmission and a channel-using method in the adjacent area are more effective since they essentially avoid interference compared to the interference dispersing method using the hopping pattern.

However, since the above-described control method and the method for transmitting data information with time differences previously considers the way other base stations have allocated the channels, and it is needed to re-allocate repeated channels, the repeated channels cannot be used, and hence the methods are ineffective in transmitting high rate packet information.

SUMMARY OF THE INVENTION

It is an advantage of the present invention to provide a forward channel configuration and allocation method in an OFDMA FDD based system for transmitting control information and data traffic with different methods, and allocating specific subcarriers to a terminal in the handoff region to minimize inter-cell interference.

In one aspect of the present invention, in a method for respective base stations of a plurality of cells to configure forward channels transmitted to a mobile station in an FDD (frequency division duplex) based mobile communication system, a forward channel configuring method comprises: (a) classifying the cells into a specific number of patterns based on location relations of the respective cells; (b) allowing the respective base stations of the cells having different classified patterns to transmit control information to the mobile station at different times within a period of the forward channel, and allowing the respective base stations of the cells having the same classified patterns to transmit control information to the mobile station at the same time; and (c) allowing the respective base stations to transmit traffic data to the mobile station irrespective of the classified patterns when the control information is transmitted in (b).

The step (a) comprises classifying the cells that have less inter-cell interference since the cells are not adjacent as the same pattern.

The step (a) further comprises classifying cells that are symmetric with respect to a specific cell from among adjacent cells as the same pattern with reference to the specific cell from the cells.

The period of the forward channel in (b) includes control information with respect to a number of patterns classified in (a).

The period of the forward channel includes a time for transmitting traffic data by the number of patterns classified in (a).

The control information and the traffic data are alternately transmitted by the number of classified patterns.

When the mobile station attempts a call to the base station of the cell to which the mobile station belongs for the first time, the control information through which the base station responds to the mobile station which attempts the call for the first time is transmitted during an interval in which the base station transmits traffic data to the mobile station which attempts the call for the first time.

In another aspect of the present invention, a method for allocating forward channels to a mobile station located in a cell in an FDD (frequency division duplex) based mobile communication system, comprises: (a) finding location information and power information on the mobile station, and determining whether the mobile station is provided in a handoff region; (b) allocating a service-possible subcarrier specific to the cell as a subcarrier usable by the mobile station when the mobile station is found to be provided in a handoff region in (a); and (c) allocating the service-possible subcarrier as a subcarrier usable by the mobile station by using information having different SIR (signal to interference ratio) values for the respective subcarriers to be allocated when the mobile station is found to be provided in a non-handoff region in (a).

The service-possible subcarrier specific to the cell in (b) is established so that classified patterns may not be repeated with service-possible subcarriers specific to different cells when the cells are classified as a predetermined number of patterns based on the respective location relations of the cells included in the mobile communication system.

The service-possible subcarrier specific to the cell is established to correspond to the service-possible subcarriers specific to the cells having the same classified pattern.

The subcarriers except the service-possible subcarrier specific to the cell in (b) are punctured by the mobile stations in the handoff region within the cell.

The service-possible subcarrier specific to the cell is modified according to a transmission frame of the traffic data.

The step (c) comprises: measuring an SIR value for each subcarrier to be allocated; and allocating the subcarrier that has the measured SIR value greater than a specific threshold value as a subcarrier usable by the mobile station.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 2:
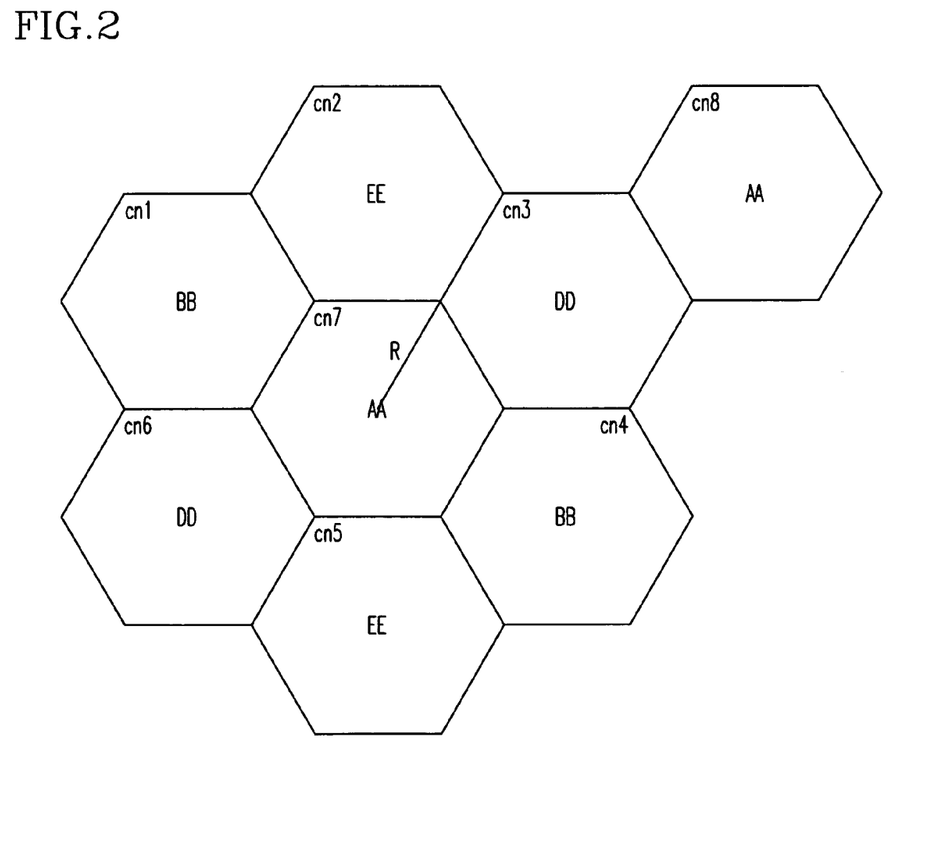
FIG. 2 shows a cell pattern configuration diagram for configuring a forward channel according to a preferred embodiment of the present invention.

FIG. 2 shows a cell pattern configuration diagram for configuring a forward channel according to a preferred embodiment of the present invention.

As shown, a plurality of cells include a central cell cn7, its six adjacent cells cn1, cn2, cn3, cn4, cn5, and cn6, and a cell cn8 which is not adjacent thereto. The central cell cn7 causes inter-cell interference in the adjacent areas from the adjacent cells cn1 to cn6, but not the cell cn8. The interference degree is fairly similar between the central cell cn7 and the respective adjacent cells cn1 to cn6.

Also, the interference is provided between the adjacent cells cn1 to cn6 with reference to the central cell cn7, for example, the cell cn1 and the cell cn4, the cell cn2 and the cell cn5, and the cell cn3 and the cell cn6 respectively transmit and receive relatively very weak interference compared to other adjacent cells.

In order to apply influences of the interference which works differently according to the locations of the cells to the forward channel configuration, the cells are classified as cells of several patterns. For example, with reference to the specific central cell cn7 as shown in FIG. 2, the cell cn8 which has the minimum interference between the cell cn8 and the central cell cn7 is classified as one of cells which have the same pattern (i.e., an AA pattern) as that of the central cell cn7, and the six cells cn1 to cn6 adjacent to the central cell cn7 are classified as cells which have the same pattern among the cells which have the weakest interference between the cells. That is, the cell cn1 and the cell cn4 are classified as cells that have a pattern (a BB pattern) which is different from the AA pattern of the central cell cn7, the cell cn2 and the cell cn5 are classified as cells that have a DD pattern, and the cell cn3 and the cell cn6 are classified as cells that have an EE pattern.

As described, in order to avoid inter-cell interference, cell patterns are configured according to locations of the respective cells, and the respective base stations in the cells that have the same pattern transmit control information of a forward channel at the same time. Therefore, the control information transmitted by the different base stations at the same time is transmitted being rarely influenced by the inter-cell interference since the interference of the cells that have the same pattern is not strong. That is, since the base stations included in the cell with strong inter-cell interference have different patterns, the times for transmitting control information of the forward channels are different, and accordingly, the inter-cell interference of the forward channels is reduced.

In the above, the patterns are classified as four patterns (AA, BB, DD, and EE) with reference to the central cell cn7, and without being restricted to this, the number of patterns can be classified as 2, 3, 5, and other numbers according to design of the OFDMA/FDD system.

Figure 3:
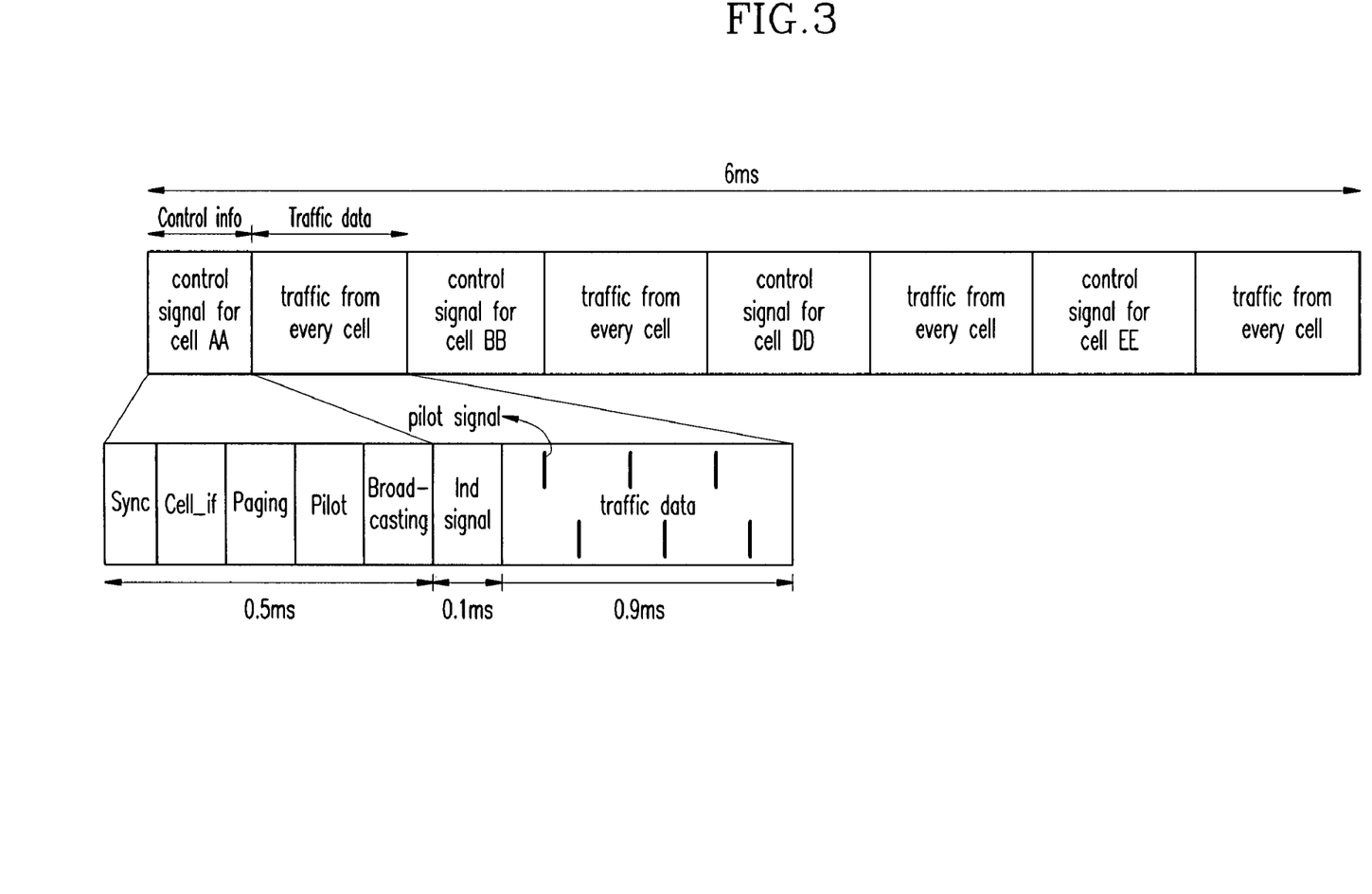
FIG. 3 shows a forward channel configuration diagram according to a preferred embodiment of the present invention.

FIG. 3 shows a forward channel configuration diagram according to a preferred embodiment of the present invention.

As shown, the forward channel has a configuration for alternately transmitting control information and traffic data four times. In this instance, the control information is sequentially transmitted according to the patterns classified for the cells. For example, the base station included in the cell that corresponds to the pattern AA from among the cells classified as the four patterns AA, BB, DD, and EE transmits corresponding control information at the first control information transmission time, the base station included in the cell that corresponds to the pattern BB transmits corresponding control information at the second control information transmission time, the base station included in the cell that corresponds to the pattern DD transmits corresponding control information at the third control information transmission time, and the base station included in the cell that corresponds to the pattern EE transmits corresponding control information at the fourth control information transmission time.

The control information includes sync information, cell identification information cell_if, paging information, and broadcasting information; each of the control information transmits information with one OFDM symbol length; and the broadcasting information includes all kinds of information needed for call requests. The traffic data are respectively transmitted after each of control information transmission time, and the length of the traffic data corresponds to substantially ten OFDM symbol lengths.

Since the base stations of the cells of the respective patterns sequentially transmit control information according to the classified patterns, the time for the base stations of the cells that have the same pattern to transmit control information at the next sequence, i.e. the control information transmission period at the same base stations, is substantially 60 OFDM symbols, and when one OFDM symbol is substantially 0.1 ms the control information transmission period has a period of substantially 6 ms. For example, next control information is transmitted after substantially 6 ms after the base stations of the cells cn1 and cn8 having the pattern AA have transmitted the control information at one time.

A terminal that has attempted a first call to a base station can attempt the next call when immediately finding whether the first call has succeeded or not. Considering this, it is desirable to transmit control information (Ind signal) that corresponds to the terminal that has attempted the first call not from a control information part that has the period of 6 ms but from the first symbol interval that transmits traffic data.

As described, when the control information is transmitted by a constant period of 6 ms and with different time differences so as to avoid interference, the period of the scheduler that transmits high rate multi-packet data is substantially 1 ms, and hence, the traffic data cannot be concurrently transmitted with different time differences through the period of the control information. That is, the base station of the cells classified as having different patterns cannot sequentially transmit traffic data.

Therefore, as shown in FIG. 3, all the base stations concurrently transmit the traffic data of all the base stations. In this instance, it is required to cancel inter-cell interference since inter-cell interference exists at the time of transmitting traffic data.

In general, information transmitted by the base station has different SIR (signal to interference ratio) values in different subcarrier regions according to locations of the respective terminals. Data rates transmittable by the terminals located near the base station in the cell are increased by using information with different SIR values for the respective subcarriers, and allocating channels to all the terminals. However, when many adjacent cells with heavy loads allocate the channels concurrently, inter-cell interference is added to the subcarriers transmitted to the terminals located on the inter-cell adjacent region to cause collisions between the subcarriers or failure to satisfy a transmittable threshold, and accordingly, it is impossible to transmit the subcarriers by using the currently allocated amounts of power. Other problems occur when a control device for controlling channel allocation by all the base stations is additionally provided so as to prevent the collisions or when the amounts of power are increased so as to satisfy the transmittable threshold.

Figure 4:
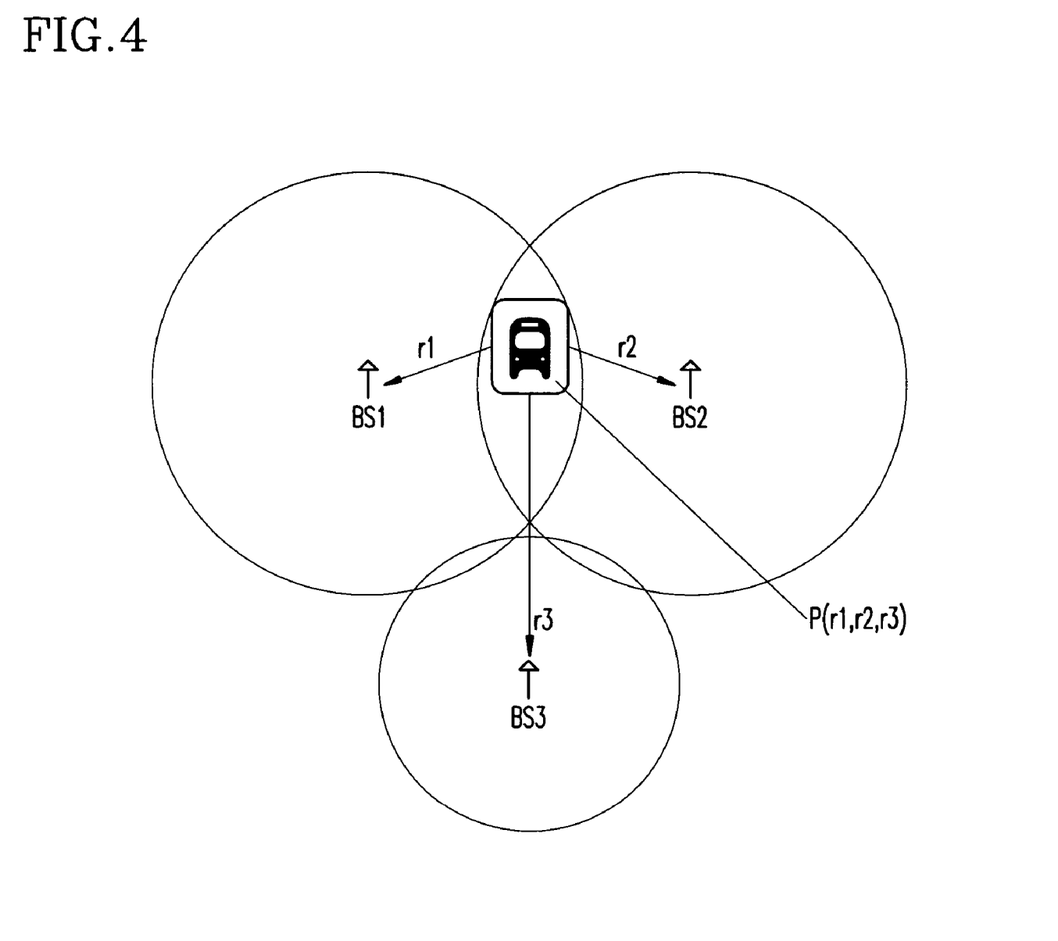
FIG. 4 shows a conceptual diagram for finding location information of a terminal by using three base stations in a general mobile communication system.

In order to prevent collisions generated in the inter-cell adjacent region and to give many data transmission opportunities to the terminals located in a region adjacent to the base station, the terminals located in the cell are classified by two regions. The two regions exemplarily include a handoff region and a non-handoff region. The location of the terminal can be found by relative location information P(r1, r2, r3) using three base stations BS1, BS2, and BS3 as shown in FIG. 4, and it is determined to which region the terminal belongs by using the location of the terminal and power variation needed for performing a handoff.

The subcarriers are allocated to the terminal which is located in the non-handoff region based on the amount of subcarriers required by the terminal by using information which has different SIR values for the respective subcarriers. The transmittable subcarriers are predefined for the respective base stations and are allocated to the terminals located in the handoff region. Other remaining subcarriers except the transmittable subcarriers are punctured. In this instance, it is defined that the identical subcarriers are allocated to the base stations that have the identical pattern and the different subcarriers are allocated to the base stations that have the different patterns.

A method for establishing subcarriers transmittable to the terminals located in the handoff region will now be described.

All the subcarriers to be allocated are divided into M groups, and each group has n subcarriers. Therefore, the total of the M-grouped subcarriers, that is, the number of the subcarriers to be allocated, is M*n.

The number of subcarriers transmittable at the same time without collisions of the base stations that have the classified patterns from among the n subcarriers configuring each group, that is, $m(m=n/(\text{number of patterns}))$ where $m=\{m_0, m_1, \ldots, m_{m-1}\}$, is found.

Start subcarriers transmittable to the first frame which is the $0^{th}$ frame for the respective base stations, that is, SSC (service-possible subcarriers) $\{SSC_{0\_m0}, SSC_{0\_m1}, \ldots, SSC_{0\_mm-1}\}$ are established. In this instance, the identical SSC are established to the base stations that have the identical pattern, and the different SSC are established to the base stations that have the different patterns.

When the traffic data are transmitted to the terminal in the handoff region by using the SSC established for each base station, the SSC transmittable for each base station are modified and established in the next frame. In this instance, the SSC for each frame (1 ms) are modified as given in Equation 1.

$$SSC_{m0}=(SSC_{0\_m0}+\text{frame\_num})\text{modulo } n, \ldots,$$
$$SSC_{mm-1}=(SSC_{0\_mm-1}+\text{frame\_num})\text{modulo } n \quad \text{Equation 1}$$

where frame_num is a number of a frame to be transmitted when the $0^{th}$ frame is set to be the start frame. That is, the number of the SSC is increased each time the frame is transmitted, and when the subcarrier corresponding to the maximum number included in the group is established, the subcarrier having the minimum number is established, and the above-noted process is repeated in the next frame to modify the SSC established for each frame.

A method for establishing subcarriers transmittable to the terminals located in the handoff region will now be described.

When the number of subcarriers in a group is eight (n), the subcarriers usable by all the base stations in the group are given as $\{0, 1, 2, 3, 4, 5, 6, 7\}$.

Figure 5:
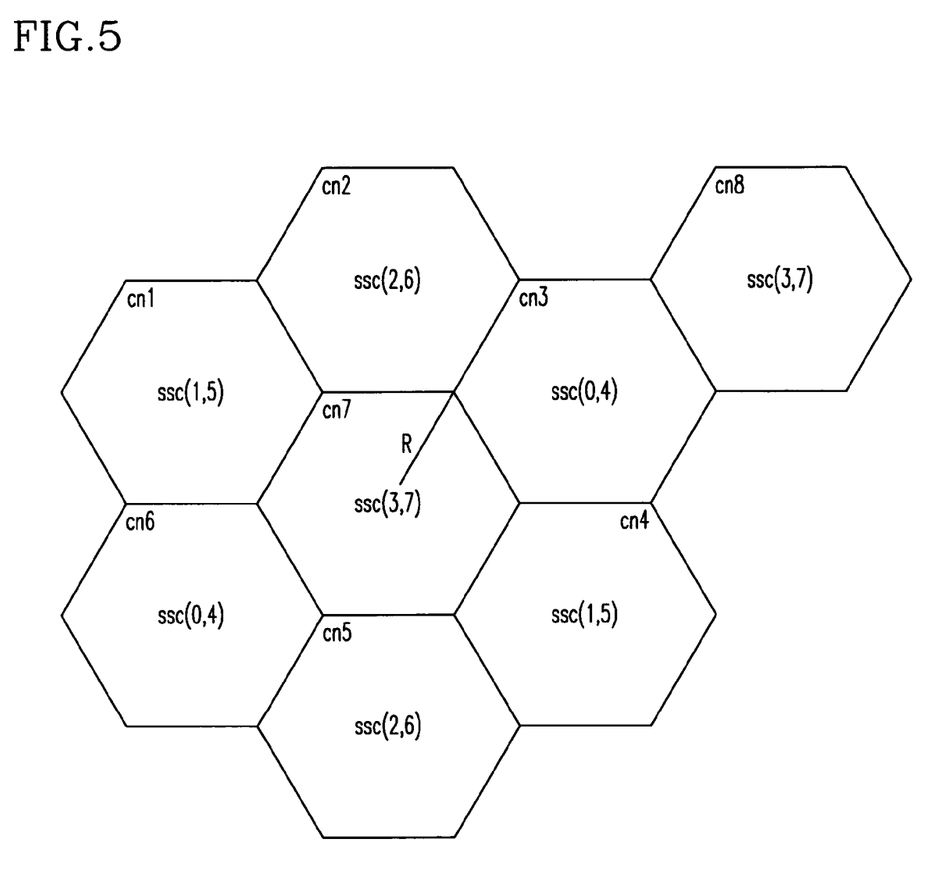
FIG. 5 shows a conceptual diagram for determining subcarriers available by the cells in a handoff region according to a forward channel allocation method according to a preferred embodiment of the present invention.

When classifying the subcarriers into the number of base station patterns, that is, four (AA, BB, DD, EE) in the case of FIG. 2 in consideration of inter-cell interference, each base station can use two (m) subcarriers. The subcarriers transmittable to the terminals in the handoff region by the respective base stations can be established constantly by the respective base stations as shown in FIG. 5. For example, the subcarriers of 1 and 5 are established as the SSC for the cells cn1 and cn4 having the identical pattern, the subcarriers of 2 and 6 are established as the SSC for the cells cn2 and cn5, the subcarriers of 0 and 4 are established as the SSC for the cells cn3 and cn6, and the subcarriers of 3 and 7 are established as the SSC for the central cell cn7 and the remaining cell cn8.

When the subcarriers transmittable at the $0^{th}$ frame are established for the respective base stations as described above, the subcarriers of 3 and 7 other than the remaining subcarriers in the group can only be used for the central cell cn7. It is obvious that other subcarriers except the established subcarriers cannot be used for the remaining cells. Accordingly, inter-cell interference is reduced since different subcarriers are used when the traffic data are respectively transmitted to the terminals located in the handoff region at the same time.

When the traffic data are transmitted at the $0^{th}$ frame according to the SSC allocated to the respective cells as described above, the SSC are modified to other ones in the next frame. Referring to Equation 1, the SSC are modified to the SSC of 2 and 6 in the cells cn1 and cn4, the SSC are modified to the SSC of 3 and 7 in the cells cn2 and cn5, the SSC are modified to the SSC of 1 and 5 in the cells cn3 and cn6, and the SSC are modified to the SSC of 4 and 0 in the cells cn7 and cn8. In this instance, since the maximum number of subcarriers included in the group is 7 in the case of the cells cn7 and cn8, the modified SSC starts again at 0 after the subcarrier of 7, and hence, the subcarrier is modified to the subcarrier of number 0. The SSC for the terminals in the handoff region are modified for each frame transmission through the above-described method.

Figure 6:
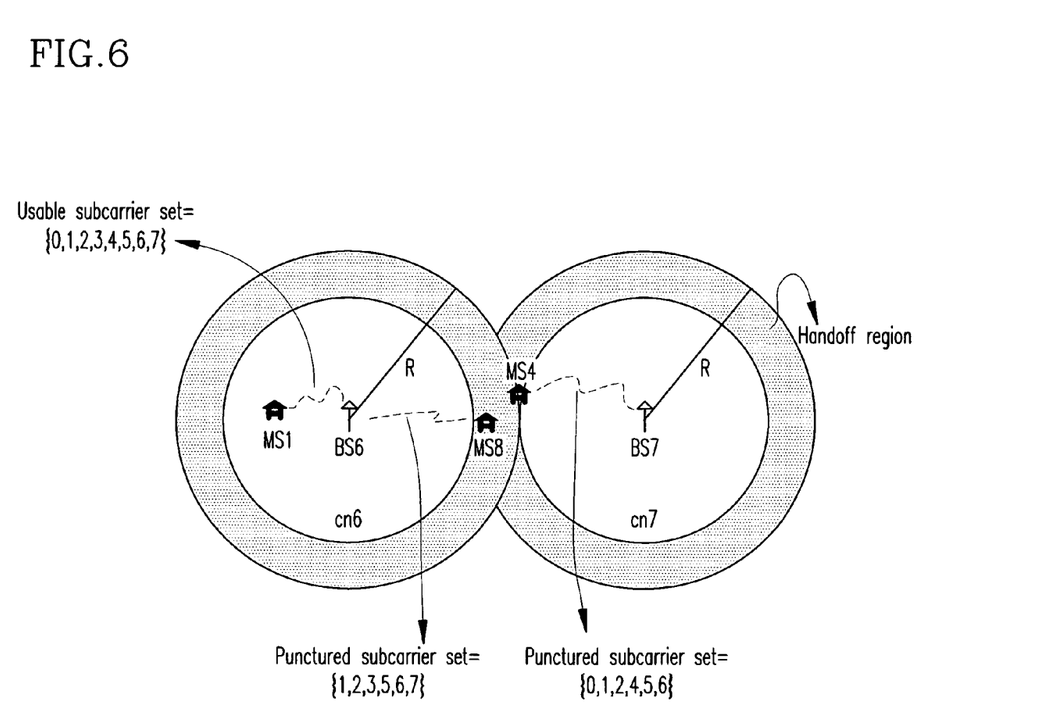
FIG. 6 shows a conceptual diagram for two base stations in two adjacent cells to allocate different subcarriers into a handoff region according to a forward channel allocation method according to a preferred embodiment of the present invention.

FIG. 6 shows a conceptual diagram for two base stations BS6 and BS7 included in the adjacent cells cn6 and cn7 to allocate different subcarriers to the handoff region.

Referring to FIG. 6, the subcarriers of 0 and 4 are allocated as the SSC for the handoff region to the cell cn6, and the subcarriers of 3 and 7 are allocated as the SSC for the handoff region to the cell cn7.

Two terminals MS1 and MS8 are provided in the cell cn6, the terminal MS1 is provided in the non-handoff region, and all the transmittable subcarriers, i.e. $\{1, 2, 3, 4, 5, 6, 7\}$, can be used. However, since the terminal MS8 is provided in the handoff region, predefined subcarriers of 0 and 4 can be used, and accordingly, the remaining subcarriers, i.e. $\{1, 2, 3, 5, 6, 7\}$, are punctured and not used.

In the same manner of the cell cn6, one terminal MS4 is provided in the cell cn7, the terminal M4 is provided in the handoff region, and predefined subcarriers of 3 and 7 can be used, while the remaining subcarriers, i.e. $\{0, 1, 2, 4, 5, 6\}$, are punctured and are not used.

Since the transmittable subcarriers are established without superposition in the handoff region between the adjacent cells cn6 and cn7, the base stations B6 and B7 in the respective cells can transmit traffic information on the transmittable subcarriers, and accordingly, the inter-cell interference frequently generated in the inter-cell superimposed adjacent region can be avoided.

The above-noted method may be a complex method for the terminals receiving predetermined subcarriers and being located in the handoff region to transmit a small amount of data traffic, but the power consumption of the base stations can be reduced because of corresponding reduction of inter-cell interference, and all the cells can transmit and receive a greater amount of data in the non-handoff region. Through this method, a benefit of using different frequency domains in the handoff region is additionally generated without transmitting and receiving channel allocation information between specific base stations as described in the prior art.

Figure 7:
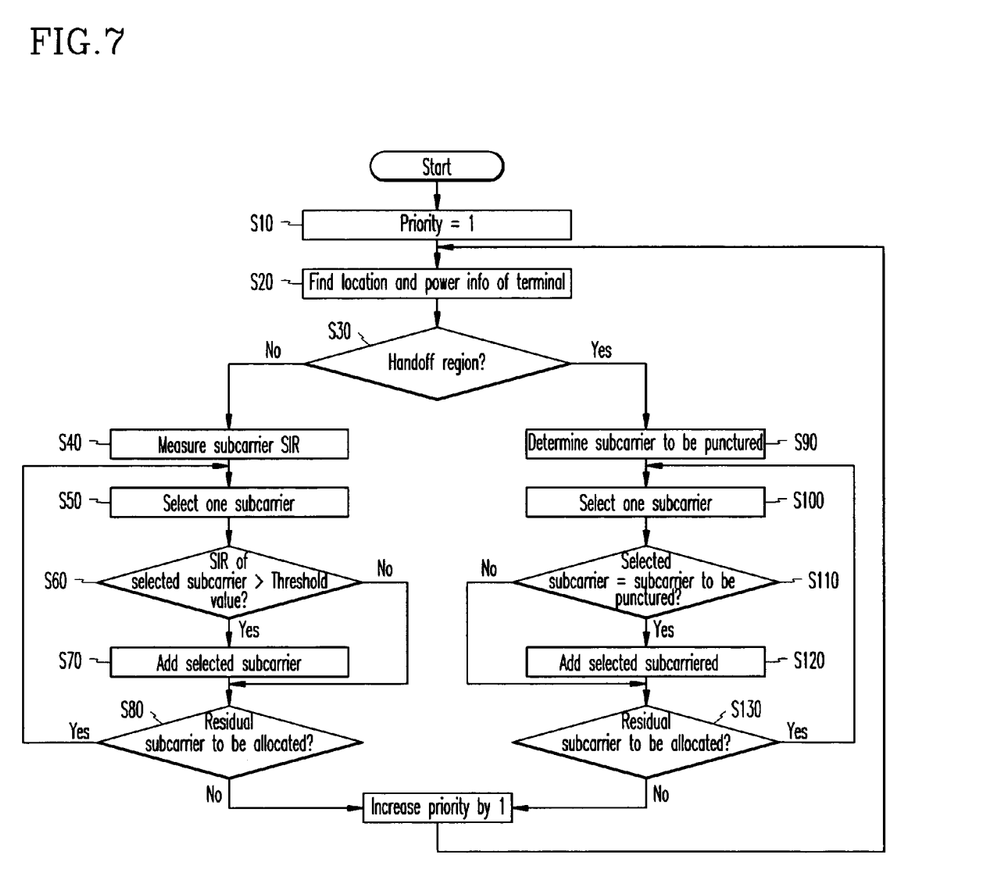
FIG. 7 shows a flowchart for a forward channel allocation method according to a preferred embodiment of the present invention.

Referring to FIG. 7, a forward channel allocation method in an OFDMA FDD based system according to the preferred embodiment of the present invention will be described.

A scheduler sets priorities of the user terminals, and the channels are allocated according to the priorities established by the scheduler.

A terminal of priority 1 is selected in order to allocate a channel to the terminal with the highest priority in step S10.

Location information of the selected terminal is found by using three base stations as shown in FIG. 4, and power information of the terminal is found in step S20.

It is determined in step S30 whether the region where the terminal is located is a handoff region by using the location information and power information of the terminal found in the previous step S20.

When the terminal selected in the step S30 is found to be located in a non-handoff region, SIR on the subcarriers to be allocated with respect to the selected terminal are measured in step S40. That is, since the selected terminal is located in the non-handoff region, the SIR on all the subcarriers {0, 1, 2, 3, 4, 5, 6, 7} are measured.

One of the subcarriers which can be allocated is selected in step S50. A selecting order is predefined, and it is assumed to select the subcarrier of 0. Therefore, the step S50 shows that the subcarrier of 0 is selected as a subcarrier to be allocated.

It is determined whether the SIR of the selected subcarrier, i.e. the subcarrier of 0, is greater than a specific threshold value in step S60, and when the SIR is greater than the specific threshold value, the selected subcarrier, i.e. the subcarrier of 0, is added to the subcarrier usable by the selected terminal in step S70, and it is determined whether further subcarriers remain to be allocated in step S80.

When the SIR is found to be below the specific threshold value in the previous step S60, the selected subcarrier cannot be used, and the step S80 for determining whether further subcarriers remain to be allocated is executed.

When remaining subcarriers to be allocated are found in the previous step S80, one of the residual subcarriers, e.g. the subcarrier of 1 which is increased by 1 from the subcarrier of 0, is selected, the SIR of the selected subcarrier is compared with the threshold value, and the selected subcarrier is added to the usable subcarrier or discarded in steps S50, 60, and 70. The steps S50, 60, and 70 are repeated until no subcarriers remain to be allocated.

When the terminal selected in the previous step S30 is found to be located in the handoff region, a list of subcarriers to be punctured with respect to the selected terminal is determined in step S90. For example, since the subcarriers defined to be allocated in the case of the handoff region with respect to the central cell cn7 are the subcarriers of 3 and 7, a list of the subcarriers to be punctured includes {0, 1, 2, 4, 5, 6}.

One of the subcarriers to be allocated is selected in step S100. The subcarriers to be allocated include {0, 1, 2, 3, 4, 5, 6, 7}, a selecting order is desirably predefined, and they are selected from the subcarrier of 0. Therefore, the subcarrier of 0 is selected as a subcarrier to be allocated in step S100.

It is determined whether the selected subcarrier, i.e. the subcarrier of 0, is to be included in the list of subcarriers to be punctured in step S110, and when the selected subcarrier is not included in the list, the selected subcarrier, i.e. the subcarrier of 0, is added to the subcarriers usable by the selected terminal, and it is determined whether further subcarriers to be allocated remain in steps S120 and S130.

When the selected subcarrier is included in the list, it is determined in step S130 whether further subcarriers to be allocated remain since the selected subcarrier is to be punctured.

When further subcarriers to be allocated remain in the previous step S80, one of the residual subcarriers, e.g. the subcarrier of 1 which is increased by 1 from the selected subcarrier which is the subcarrier of 0, is selected, it is determined whether the selected subcarrier is included in the list of subcarriers to be punctured, and the determined subcarrier is added to the usable subcarriers or it is discarded in steps S100, S110, and S120. The above steps S100, S110, S120, and S130 are repeated until no subcarriers remain to be allocated.

When the channel allocation to the terminal with the highest priority which is 1 is finished, a terminal with the next priority is selected so as to perform channel allocation on the terminal with the next priority in step S140, and the channel allocation process S20 to S140 on the selected terminal is repeated to thus allocate the channel to the respective terminals.

The above-described forward channel configuration method and the forward channel allocation method can be realized as a program and stored in computer-readable recording media (a CD-ROM, a RAM, a floppy disk, a hard disk drive, or an optical disk).

Since the subcarriers of adjacent cells are allocated by minimizing the inter-cell interference, transmission capacity of the respective cells is increased.

Also, since various data rates are supported according to requests by the respective terminals in the non-handoff region, the subcarriers can be allocated so that instant increasing features of packets may be maintained and other terminals may use resources well.

Further, since the method for allocating the channels in the handoff region is already given among the base stations, no complicated communication of information among the base stations is needed.

In addition, since retransmission requests required when errors occur in control information among adjacent base stations are reduced, and a call request process by each terminal is processed in a short time, requirements of further terminals are satisfied.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. In a method for respective base stations of a plurality of cells to configure forward channels transmitted to a mobile station in an FDD (frequency division duplex) based mobile communication system, a forward channel configuring method comprising:
   (a) classifying the cells into a specific number of interference patterns based on location relations of the respective cells;
   (b) preventing the respective base stations of the cells having different classified patterns to sequentially transmit control information to the mobile station during different defined periods within a period of the forward channel, and allowing the respective base stations of the cells having the same classified patterns to concurrently transmit control information to the mobile station exclusively during one of the defined periods; and
   (c) allowing the respective base stations to transmit traffic data to the mobile station irrespective of the classified patterns when the control information is transmitted in (b), wherein (a) comprises classifying the cells, which have less inter-cell interference since the cells are not adjacent, as those having the same pattern.

2. The forward channel configuring method of claim 1, wherein (a) comprises classifying cells, which are symmetric with respect to a specific cell from among the adjacent cells, as the same pattern with reference to the specific cell from the cells.

3. The forward channel configuring method of claim 1, wherein the period of the forward channel in (b) includes control information with respect to a number of patterns classified in (a).

4. The forward channel configuring method of claim 3, wherein the period of the forward channel includes a time for transmitting traffic data by the number of patterns classified in (a).

5. The forward channel configuring method of claim 4, wherein the control information and the traffic data are alternately transmitted by the number of classified patterns.

6. The forward channel configuring method of claim 1, wherein when the mobile station attempts a call to the base station of the cell to which the mobile station belongs to for the first time, the control information through which the base station responds to the mobile station which attempts the call for the first time is transmitted during an interval in which the base station transmits traffic data to the mobile station which attempts the call for the first time.

7. In a method for allocating forward channels to a mobile station located in a cell in an FDD (frequency division duplex) based mobile communication system, the method comprising:
  (a) finding location information and power information on the mobile station, and determining whether the mobile station is provided in a handoff region located in an inter-cell region adjacent to the mobile station;
  (b) allocating a service-possible subcarrier specific to the cell as a subcarrier usable by the mobile station when the mobile station is found to be provided in a handoff region in (a); and
  (c) allocating the service-possible subcarrier as a subcarrier usable by the mobile station by using information having different SIR (signal to interference ratio) values for the respective subcarriers to be allocated when the mobile station is found to be provided in a non-handoff region located in the inter-cell region adjacent to the mobile station in (a), wherein collisions generated in the inter-cell adjacent region are prevented.

8. The method of claim 7, wherein the service-possible subcarrier specific to the cell in (b) is established so that classified patterns may not be repeated with service-possible subcarriers specific to different cells when the cells are classified as a predetermined number of patterns based on the respective location relations of the cells included in the mobile communication system.

9. The method of claim 8, wherein the service-possible subcarrier specific to the cell is established to correspond to the service-possible subcarriers specific to the cells having the same classified pattern.

10. The method of claim 7, wherein the subcarriers except the service-possible subcarrier specific to the cell in (b) are punctured by the mobile stations in the handoff region within the cell.

11. The method of claim 7, wherein the service-possible subcarrier specific to the cell is modified according to a transmission frame of the traffic data.

12. The method of claim 7, wherein (c) comprises:
  measuring an SIR value for each subcarrier to be allocated; and
  allocating the subcarrier, which has the measured SIR value greater than a specific threshold value, as a subcarrier usable by the mobile station.

13. The method of claim 8, wherein the cells which have less inter-cell interference because the cells are not adjacent are classified as those having the same pattern.

14. The method of claim 8, wherein the cells which are symmetric with respect to the specific cell from among the adjacent cells with reference to the specific central cell from among the cells are classified as those having the same pattern.

15. In a method for respective base stations of a plurality of cells to configure forward channels transmitted to a mobile station in an FDD (frequency division duplex) based mobile communication system, a recording medium for storing a program for realizing functions comprising:
  (a) classifying the cells into a specific number of interference patterns based on location relations of the respective cells;
  (b) preventing the respective base stations of the cells having different classified patterns to sequentially transmit control information to the mobile station during different defined periods within a period of the forward channel, and the respective base stations of the cells having the same classified patterns to concurrently transmit control information to the mobile station exclusively during one of the defined periods; and
  (c) allowing the respective base stations to transmit traffic data to the mobile station irrespective of the classified patterns when the control information is transmitted in (b).

16. In a method for allocating forward channels to a mobile station located in a cell in an FDD (frequency division duplex) based mobile communication system, a recording medium for storing a program for realizing functions comprising:
  (a) finding location information and power information on the mobile station, and determining whether the mobile station is provided in a handoff region located in an inter-cell region adjacent to the mobile station;
  (b) allocating a service-possible subcarrier specific to the cell as a subcarrier usable by the mobile station when the mobile station is found to be provided in the handoff region in (a); and
  (c) allocating the service-possible subcarrier as a subcarrier usable by the mobile station by using information having different SIR (signal to interference ratio) values for the respective subcarriers to be allocated when the mobile station is found to be provided in a non-handoff region located in the inter-cell region adjacent to the mobile station in (a), wherein collisions generated in the inter-cell adjacent region are prevented.

* * * * *